United States Patent [19]

Schulz et al.

[11] 3,718,304
[45] Feb. 27, 1973

[54] ENGINE MOUNT ASSEMBLY

[75] Inventors: John C. Schulz, Springboro; Richard W. Lyday, Vandalia, both of Ohio

[73] Assignee: General Motors Corporation, Detroit, Mich.

[22] Filed: March 23, 1972

[21] Appl. No.: 237,441

[52] U.S. Cl. .................................. 248/9, 180/64 R
[51] Int. Cl. ................................................ F16f 15/00
[58] Field of Search ............ 248/9, 10, 5, 15, 358 R; 180/64 R; 267/153

[56] References Cited

UNITED STATES PATENTS

| | | | |
|---|---|---|---|
| 2,115,672 | 4/1938 | Riesing | 248/9 |
| 2,953,336 | 9/1960 | Etchells | 248/9 |
| 3,135,224 | 6/1964 | McLean | 248/9 X |
| 3,139,152 | 6/1964 | Bajer | 180/64 R |

Primary Examiner—J. Franklin Foss
Attorney—J. L. Carpenter et al.

[57] ABSTRACT

An engine mount assembly for resiliently supporting an engine on a frame of a motor vehicle includes a pair of mounting brackets and an insert. The insert and one of the brackets have cooperating rails preventing relative movement therebetween in two mutually perpendicular directions while rivets normally secure the insert and this one bracket against movement in a third direction perpendicular to the other two directions. Rubber is secured between the other bracket and the insert for yieldingly resisting relative movement therebetween to normally isolate engine vibrations and these members also have abutments which engage on predetermined relative movement therebetween in the stated third direction to transmit force to the rivets. Rubber secured between the insert and the stated one bracket operates to yieldingly resist movement therebetween in the stated third direction when the rivets are sheared.

3 Claims, 5 Drawing Figures

PATENTED FEB 27 1973

ENGINE MOUNT ASSEMBLY

This invention relates to an engine mount assembly and more particularly to an engine mount assembly providing a normal engine isolation mode under normal operating conditions and another control mode to control engine movement under larger than normal force conditions.

The engine mount assembly according to the present invention comprises a pair of mounting brackets and an insert located between these brackets. The insert and one of the brackets have cooperating rails for preventing relative movement therebetween in mutually perpendicular directions while permitting relative movement therebetween in the fore and aft directions of the vehicle with rivets securing the insert and this bracket to normally prevent the latter movement. Rubber is secured between the other of the brackets and the insert for yieldingly resisting relative movement therebetween to control engine jounce, fore and aft movement, and roll. The latter bracket and the insert have abutments that operate to engage on predetermined relative movement therebetween in the fore and aft directions to force shearing of the rivets. Rubber is secured between the riveted insert and bracket and operates to yieldingly resist movement therebetween when the rivets are forced to shear.

An object of the present invention is to provide a new and improved engine mount assembly for resiliently supporting an engine on a frame of a motor vehicle.

Another object is to provide an engine mount assembly for resiliently supporting an engine on a frame of a motor vehicle providing a normal vibration isolation control mode during normal operating conditions and another control mode to control relative movement between the engine and the frame on encountering forces above the normal operating range.

Another object is to provide an engine mount assembly for resiliently supporting an engine on a frame of a motor vehicle comprising a pair of series connected resilient assemblies, one assembly operating to control engine movement relative to the frame during normal operating conditions and the other assembly only operating on encountering forces above the normal operating range to control engine movement fore and aft of the frame.

These and other objects of the present invention will be more apparent from the following description and drawing in which.

Figure 1:
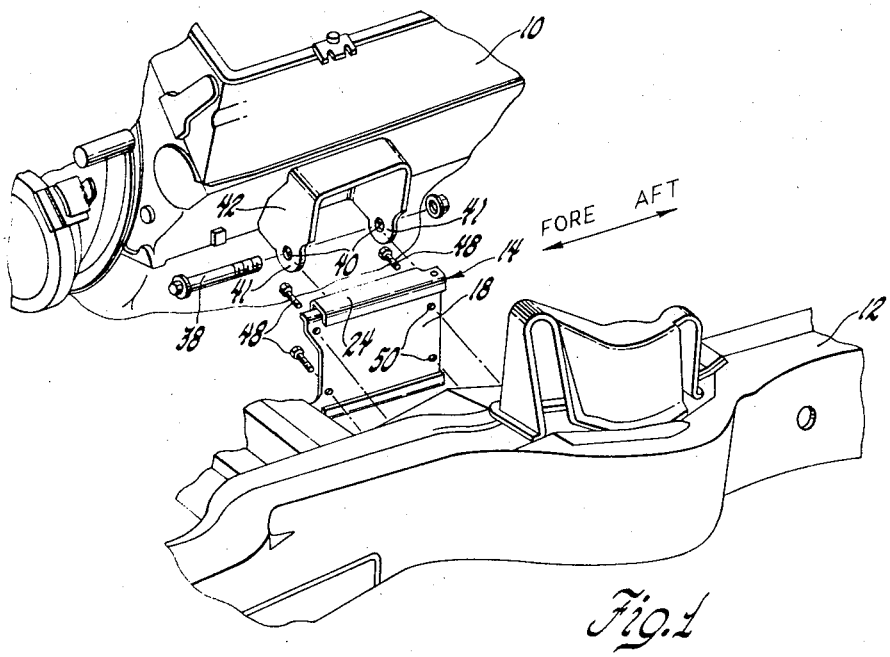
FIG. 1 is a partially exploded, perspective view of an internal combustion engine resiliently supported on a frame of a motor vehicle by an engine mount assembly constructed according to the present invention.

Referring now to the drawing and particularly to FIG. 1, there is shown an internal combustion engine 10 which is supported at its opposite sides on a frame 12 of a motor vehicle by a pair of engine mount assemblies 14 constructed according to the present invention, there being only one engine mount assembly shown. These mounts act as the forward support for the mounting system which may be of the three point type which has an additional centrally located rearward mount, not shown, whose attachment is between a transmission secured to the engine and a cross member of the frame.

Figure 2:
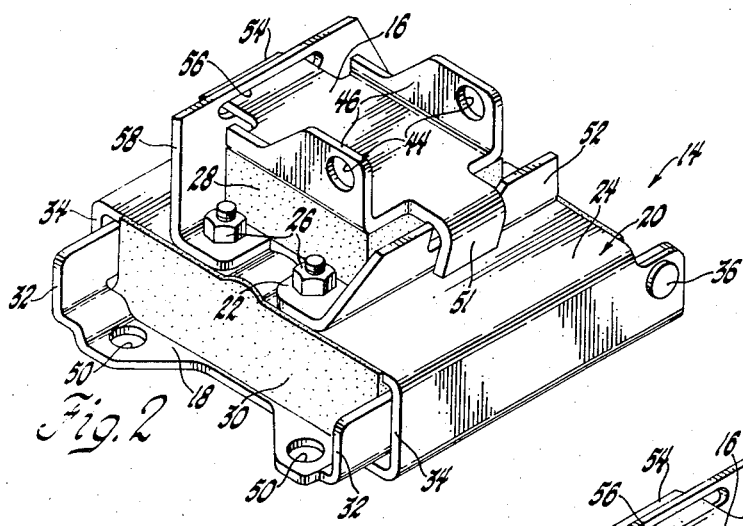
FIG. 2 is an enlarged perspective view of the engine mount assembly of FIG. 1.
Figure 5:
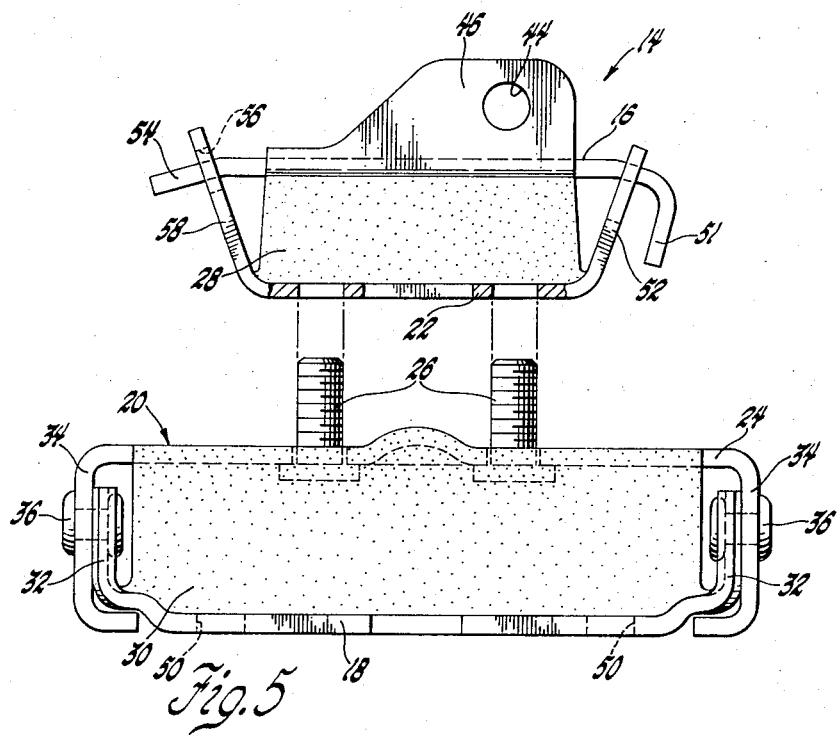
FIG. 5 is an enlarged, partially exploded, transverse sectional view of the engine mount assembly of FIG. 1.

Referring to FIGS. 2 and 5, each of the engine mount assemblies according to the present invention comprises an engine mounting bracket 16, a frame mounting bracket 18 and an insert 20 located therebetween. The insert may be of one-piece construction or an assembly comprising an upper generally U-shaped member 22 and a lower channel-shaped member 24 which are rigidly secured at their flat bases by bolts 26 at the four corners of these bases. A pad 28 of resilient material such as rubber is bonded between opposed flat portions of the engine mounting bracket 16 and the upper insert member 22 and another pad 30 also of resilient material such as rubber is bonded between opposed flat portions of the lower insert member and the frame mounting bracket 18. However, the lower insert member 24 and the frame mounting bracket 18 are normally rigidly connected by the frame mounting bracket 18 being formed with longitudinally extending upstanding rails 32 which are received in longitudinally extending C-shaped channel sections 34 formed on opposite sides of the lower insert member 24. The rails 32 and channels 34 cooperate to prevent relative movement between the frame mounting bracket 18 and the insert 20 in two mutually perpendicular directions which are vertical and horizontal as viewed in FIG. 5 while permitting guided relative movement therebetween in the longitudinal direction of the rails and channels. Relative longitudinal movement between the insert 20 and bracket 18 is normally prevented by a pair of rivets 36 which rivet the two pairs of rails 32 and channel sections 34 at one end thereof where they project beyond the rubber pad 30.

In the vehicle installation as shown in FIG. 1, the engine mount assembly 14 is connected to the engine by a bolt 38. The bolt 38 extends through a pair of axially aligned holes 40 in the depending arms 41 of a saddle mount 42 fixed to the engine block and through axially aligned holes 44 provided in a pair of upstanding arms 46 depending from the engine mounting bracket 16 which fit between the arms 41. The engine mount assembly 14 is secured to the frame 12 by bolts 48 which extend through holes 50 in the four corners of the frame mounting bracket 18.

The front engine mount assemblies are arranged relative to the engine so that the rubber pad 28 is in position to resist engine roll and fore and aft movement in shear and engine jounce in compression. Furthermore, the rails 32 and the channel sections 34 of the engine mounts are arranged to extend longitudinally of the vehicle so that forces in the fore and aft directions which are indicated by the directional arrows in FIG. 1 act to shear the rivets 36 which are at right angles thereto.

Figure 3:
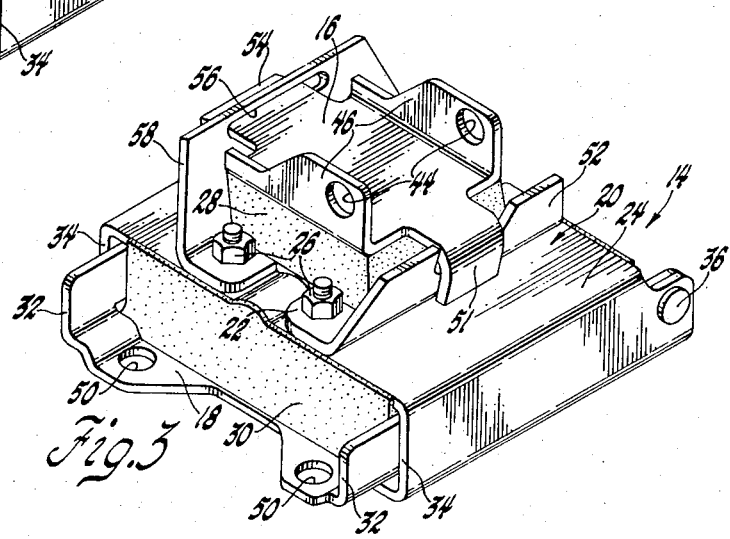
FIG. 3 is a view similar to FIG. 2 but showing the engine mount assembly in a normal deflection condition.
Figure 4:
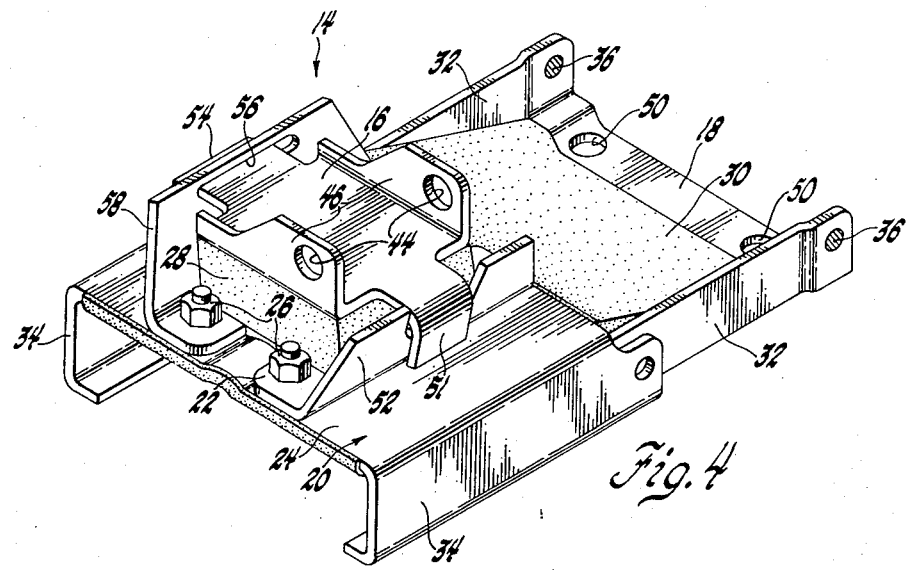
FIG. 4 is also a view similar to FIG. 2 but showing the engine mount assembly in a greater than normal deflection condition.

The shear strength of the rivets 36 is determined so that during normal vehicle operation they will not shear and thus maintain mechanical connection between the insert 20 and frame mounting bracket 18 so that only the rubber pad 28 between engine mounting bracket 16 and the insert 20 operates to isolate engine vibrations from the frame. A tongue 51 depending downward from one fore and aft extending side of the engine mounting bracket 16 moves free of one upstanding arm 52 of the upper insert member 22 during normal engine vibration as shown in FIG. 2 and is engagable therewith to limit engine roll. The engine mounting bracket 16 has an additional tongue 54 projecting from the other fore and aft extending side into a fore and aft extending slot 56 in the other upstanding arm 58 of the upper insert member 22. The length of slot 56 is determined so that the tongue 54 will not engage the insert arm 58 at either end of slot 56 as shown in FIG. 2 except when the force urging relative fore or aft movement of the engine relative to the frame exceeds a certain limit to bring about such engagement as shown in FIG. 3, this force or load limit being determined to be above those forces encountered during normal operating conditions. When there is a larger than normal force that effects longitudinal movement between the engine and frame to the extent that the tongue 54 bottoms out in either end of the slot 56, this load and any additional load is then transferred mechanically past rubber pad 28 to rivets 36 and thence to the frame. Then when the load exceeds the rivets' shear strength they shear to permit the engine mounting bracket 16 and insert 20 to move as a unit in either fore or aft direction with respect to the frame mounting bracket 18 as shown in FIG. 4 with the rubber pad 30 then yielding or deflecting to retard such movement which is limited to the fore and aft directions by the cooperating rails 32 and channel sections 34. Since the two rubber pads 28 and 30 do operate independently of each other, their compositions may be different with that of pad 28 selected to provide optimum engine vibration isolation and that of pad 28 selected on a different basis to provide the desired deceleration between engine and frame when the rivets shear.

The above described embodiment is illustrative of the invention which may be modified within the scope of the appended claims.

We claim:

1. An engine mount assembly for resiliently supporting an engine on a frame comprising a pair of mounting brackets, an insert located between said brackets, securing means for normally securing said insert and one of said brackets, first resilient means secured between the other of said brackets and said insert for normally yieldingly resisting relative movement therebetween, said other bracket and said insert having abutment means operable to engage on predetermined relative movement therebetween in one direction to mechanically transmit load between said other bracket and said insert to said securing means, and second resilient means secured between said insert and said one bracket for yieldingly resisting movement therebetween when said securing means is forced to release said insert and said one bracket for relative movement.

2. An engine mount assembly for resiliently supporting an engine on a frame comprising a pair of mounting brackets, an insert located between said brackets, securing means including shearable means for normally securing said insert and one of said brackets, first resilient means secured between the other of said brackets and said insert for normally yieldingly resisting relative movement therebetween in three mutually perpendicular directions, said other bracket and said insert having abutment means operable to engage on predetermined relative movement therebetween in one of said directions to mechanically transmit load between said other bracket and said insert to said shearable securing means in excess of the load transmission ability of said first resilient means, and second resilient means secured between said insert and said one bracket for yieldingly resisting movement therebetween in said one direction when said shearable means is forced to shear.

3. An engine mount assembly for resiliently supporting an engine on a frame comprising a pair of mounting brackets, an insert located between said brackets, said insert and one of said brackets having cooperating rail and channel means for preventing relative movement there between in two mutually perpendicular directions and guiding relative movement there between in a third direction perpendicular to the other two directions, shearable securing means for normally securing said insert and said one bracket against relative movement in said third direction, first resilient means secured between the other of said brackets and said insert for normally yieldingly resisting relative movement there between, said other bracket and said insert having abutment means operable to engage on predetermined relative movement there between in said third direction to transmit load between said other bracket and said insert to said shearable securing means in excess of the load transmission ability of said first resilient means, and second resilient means secured between said insert and said one bracket for yieldingly resisting guided movement there between in said third direction when said shearable securing means is forced to shear.

* * * * *